United States Patent [19]

Andersen et al.

[11] 4,415,596

[45] Nov. 15, 1983

[54] COATED CONFECTIONERY WITH A HIGH PROTEIN CONTENT AND PROCESS FOR PRODUCTION THEREOF

[75] Inventors: Geert Andersen; Manfred Lemke, both of Halle in Westfalen, Fed. Rep. of Germany

[73] Assignee: August Storck KG, Fed. Rep. of Germany

[21] Appl. No.: 415,694

[22] Filed: Sep. 7, 1982

Related U.S. Application Data

[63] Continuation of Ser. No. 134,412, Mar. 27, 1980, abandoned.

[30] Foreign Application Priority Data

Mar. 29, 1979 [DE] Fed. Rep. of Germany ....... 2912412

[51] Int. Cl.³ ............................................. A23G 00/00
[52] U.S. Cl. .................................... 426/103; 426/660
[58] Field of Search ................. 426/660, 103, 93, 307, 426/516

[56] References Cited

U.S. PATENT DOCUMENTS 3,677,771 7/1972 Kolar, Jr. ............................ 426/660
3,730,735 5/1973 Rash, Jr. ............................. 426/660

Primary Examiner—Hiram H. Bernstein
Attorney, Agent, or Firm—Murray & Whisenhunt

[57] ABSTRACT

There is provided a coated confectionery having a high protein content, wherein a core compound containing albumin is coated with a fat containing pliable, soft caramel compound. The albumin may be present in both the core compound and the coating compound. The albumin may be in the form of hydrophobed albumin particles.

6 Claims, No Drawings

COATED CONFECTIONERY WITH A HIGH PROTEIN CONTENT AND PROCESS FOR PRODUCTION THEREOF

This is a continuation application of Ser. No. 134,412, filed Mar. 27, 1980 now abandoned.

The invention relates to a coated confectionery with high protein content, e.g., a high albumin content, and a process for the production thereof. More particularly, the invention relates to such confectionery with improved mouth feel and taste.

BACKGROUND OF THE INVENTION

For nutritional purposes, a diet rich in protein is increasingly considered to be important. Confectioneries, especially candy, heretofore, have not been widely used in fulfilling this nutritional requirement. While products such as confectioneries which are relatively rich in protein, e.g., albumin, have been produced for the population of economically depressed countries to help control starvation, such as countries in the Near East and the Far East, these confectioneries have not been successful since they have been unsatisfactory from an organoleptic point of view. Thus the prior products have had such an unpleasant consistency and flavor during chewing that they were not generally accepted and used by these people. Additionally, these prior products suffer from the disadvantage that they cannot be produced with fast-running, cutting and winding machines as customarily now used in the confectionery industry. Compounds and compositions which are rich in protein, e.g., albumin, are extremely tough when the proteins (e.g. albumin) are fully dissolved. Accordingly, the compounds and composition have been, primarily, processed into food products by forming a paste thereof. The paste, which is moist and crumbly, and may be molded, e.g., into bars, and then cut and dried on the surface either prior to or after packaging. The dried products, however, have a rubber-like and tough texture during chewing and with continued chewing the protein (e.g. albumin) components, begin to swell and produce an unpleasant slimy consistency, especially in the case of higher protein, e.g. albumin contents. These unpleasant organoleptic properties and taste have, thus, prevented the wide acceptance of confectioneries with a high protein content.

German Pat. No. 130,910 discloses an improved confectionery, which is rich in protein, based on the protein being in the form of a gel, especially as a milk protein gel (along with of course water). However, this confectionery is still unsatisfactory.

OBJECTS OF THE INVENTION

Thus, it is an object of the present invention to provide a confectionery or candy composition which has a high content of protein, e.g., albumin, which is capable of providing a pleasant taste and which also provides satisfactory organoleptic properties, especially mouth feel characteristics. It is a further object of the invention to provide such composition which may be processed with modern production methods and apparatuses.

BRIEF DESCRIPTION OF THE INVENTION

It has now been surprisingly found that the objects of the invention may be achieved by forming a core of the protein, e.g., albumin, in the form of a liquid or paste compound and coating that core with a fat containing, pliable, soft caramel compound. As a result, a strand of the coated core is provided where the predominate characteristics of the coated strand are that of the coating. This not only provides the required organoleptic properties but allows the strand to be processed in the desired manner with modern high speed machinery.

DETAILED DESCRIPTION OF THE INVENTION

The soft caramel compound, which may be a toffy-like caramel, surrounds the core rich in protein, e.g., albumin, and imparts the desired processing characteristics to the core, which is lower in fat and is crumbly by reason of its high protein e.g. albumin content. In addition, the caramel compound imparts surprisingly advantageous taste and consistency characteristics. On the basis of these characteristics, the confectionery according to the invention may be processed, either by hand or with customary modern high speed devices, into the form of a strand and may be guided through levelling rollers, cutting and winding stations of a customary confectionery producing apparatus, without causing breakdowns.

In view of the taste and chewing characteristics, it has further been found that it is surprisingly advantageous to incorporate the protein, e.g. albumin in the core in the form of hydrophobed (hydrophobic) protein, e.g. albumin particles, or if desired, into the soft caramel compound. These hydrophobed protein, e.g. albumin particles may be, for example, particles which are formed by coating them with a layer of fat. This may be achieved, for example, by working a vegetable fat, an animal fat, a synthetic cooking fat and/or lecithin well into the protein, e.g. albumin materials used for the production of the confectionery.

The confectionery of the invention, which, according to this preferred embodiment, contains the protein, e.g. albumin in the core compound and/or the soft caramel compound in the form of surface hydrophobed albumin particles, has the unexpected advantage that it may be more easily chewed. Thus, the otherwise rubber-like and tough texture, normally associated with agglomerated particles, does not occur since the particles are separated. Further, this provision does not lead to the slimy consistency which was unavoidable in the case of eating the prior art products rich in protein, e.g. albumin. This is because the particles are hydrophobed on their surface and the usual swelling is largely prevented during the chewing process. Accordingly, the undesirable slimy consistency of the product on chewing does not occur, as opposed to that which would immediately occur in the case of the prior art products with similar high protein, e.g. albumin contents. On the basis of these superior organoleptic properties, especially during chewing, the present confectioneries are acceptable for providing the valuable proteins for human consumption, while at the same time the products provide satisfactory taste. This also makes it possible to make use of vegetable proteins which heretofore could only be used with difficulty.

According to a preferred embodiment of the invention, the confectionary has a protein content of at least 5% by weight and preferably of about 10 to 50% by weight. Advantageously, the present confectionery comprises at least 20% by weight of the core compound, rich in albumin, and even more preferably at about 25 to 75% by weight of the core compound, and at about 75 to 25% by weight of the soft caramel compound coating. Preferably the protein, e.g., albumin, is derived from milk, milk powder, skim milk powder, albumin components from milk, sodium caseinate and/or lactic albumin. As a vegetable protein albumin, especially soy albumin is preferred.

Alternatively, there may be used enzymatically decomposed albumin or protein. For example, enzymatically decomposed protein, e.g. albumin has a molecular weight of 1,500 to 10,000, and such enzymatically decomposed protein, e.g. albumins have the advantage that the aging phenomena, which occurs with high molecular weight protein, is avoided. In addition, the normal hardening and loss of taste is also avoided. As a result, the product has improved storage life and easier chewability.

The enzymatically decomposed albumins or proteins may be obtained in manners known to the art, e.g., by conversion of natural proteins and albumin, with proteolytic enzymes of low activity at temperatures and pH values which are optimal for the specific enzymes used. For example, enzymatic decomposition of the protein or albumin components of the whey, milk, soy beans, corn, potatoes, wheat, oil seed, nut kernels, sunflower seeds, eggs and/or gelatin with proteolytic enzymes, such as protease, in combination with lipase or amylase, is suitable. It is also suitable to use the enzymatic decomposition products which have been formed in the presence of gelatin or gelatin decomposition products.

It is advantageous to keep the fat content of the core compound rich in protein, e.g. albumin somewhat lower than that of the soft caramel compound, whereby the core compound preferably has a fat content in the range of about 3 to 15% by weight and more preferably of about 3 to 5% by weight, while the pliable, soft caramel coating compound advantageously has a fat content of about 5 to 30% by weight and more preferably of about 6 to 10% by weight.

Swelling or gelling agents such as carregeenates, pectins, agar, alginates, such as sodium alginate, potassium alginate, calcium alginate etc., methyl cellulose, carboxy methyl cellulose, fine carob bean flour, traganth, starch in a chemically treated and/or modified form and especially gelatin or gum arabic may be incorporated in both the core compound and the soft caramel compound coating. As a result of this, cohesion of the undissolved protein, e,g. albumin particles, in high concentrations, will be achieved and avoid the normal crumbly consistency of the material. Thus, during the time required for the processing, the necessary minimum pliability of the core compound will be achieved. Thereafter, the core compound again assumes its original crumbliness without impairing its taste.

According to this embodiment of the invention, the core compound and/or in the soft caramel compound coating will contain one or more of the above-mentioned swelling or gelling agents in an amount of about 0.5 to 5% by weight. These agents are used preferably in in the form of a solution thereof during the production of the confectionery, which solution is mixed or kneaded into the remaining components of the core or coating.

The confectionery, beside the components mentioned above in connection with the core compound and the soft caramel compound, may also contain components customary in the confectionery industry, such as colorings sweeteners, preservatives, flavorings and/or aromatic substances.

Thus, the confectionery according to the invention may contain, especially, sugar, such as saccharose, dextrose, maltodextrin, glucose syrup and/or lactose, sugar exchange substances such as sorbite, xylite and/or sweetening agents. The confectionery furthermore may contain in the core compound and especially in the soft caramel compound coating customary flavorings, such as strongly or weakly de-oiled cocoa powder, cocoa compound, chocolate compound, fruit flavors and/or caramel flavor and may be aromatized with customary aromatic substances, such as vanilla, cooking salts or essences, to produce desired flavors. Furthermore, the confectionery may contain customary food colorings, preservatives and stabilizing agents. The additives customary for this, which may be used individually or in combination, are well known and will not be detailed herein for sake of conciseness.

The core may be totally coated (i.e., coated on all sides) with the soft caramel compound, but it preferably is in a partially coated form, especially disc-like. Thus, the confectionery may be cut from a strip in which the soft caramel compound surrounds the core compound, preferably with an optical contrast between the core and coating. The cut section from the strip is then in the form of a ring. For example, the core may be of a lighter color than the soft caramel compound coating in order to make the high protein content core compound optically visible.

In producing the confectionery, the components, e.g., the albumin, sweetener, fat, swelling agent etc., may be in the form of individual components or in the form of mixtures, so that it will be possible, for example, to use different types of albumin, such as possibly enzymatically decomposed vegetable and animal albumin in the form of mixtures. The same is true for the sweeteners, fats, swelling agents and auxiliary substances, such as the aromatic substances, flavorings, colorings, preservatives and stabilizing agents.

In a particularly advantageous form of the process, of all the core ingredients, e.g., albumin particles, the sweetener, fat and water are mixed in a heated kneading apparatus to a pasty consistency, after which the swelling agent, if used, is dissolved in water and added to the mixture with further working to thoroughly mix all ingredients. In this case, a mixing temperature of no more than 50° C. should be used because of the high portion of albumin. The soft caramel compound coating is advantageously formed in the customary manner with or without the use of the above-noted fat coated protein, e,g. albumin particles, by kneading and then rolling in the customary manner in a concher to bring it to the desired consistency. The soft caramel compound is made by boiling a sweetener (e.g., sugar, glucose syrup or sorbite) and then adding sweetened and evaporated milk, the swelling agent (when used) and the hydrophobed albumin particles (when used), with stirring. The soft caramel compound may be aromatized in the customary manner with vanilla, cooking salt or essences and is cooled. While forming the caramel compound (preferably dark in color) and the core compound (preferably light in color), a total protein content of both the core and coating of preferably 15 to 25% by weight is achieved.

Thereafter, the core compound is coated with the soft caramel compound by known apparatus, i.e., an extruder which has two extrusion heads and produces a soft caramel strand filled with the core compound. Subsequently, this strand is guided across a tapered roller and cutting-winding devices and is processed in this manner into individual candies or bars.

Thus, one will obtain a confectionery with a core rich in protein, e.g. albumin and a pliable soft caramel compound surrounding the core, whereby the total protein content depends primarily on the ratio of the protein, e.g. albumin rich core compound to the soft caramel compound coating.

What is claimed is:

1. A partially coated confectionery having a protein content of from 10 to 50 percent by weight, comprising a core of a paste-like compound rich in protein, wherein the protein is in the form of hydrophobed protein particles, and a coating of a fat containing pliable, soft caramel compound partially coating and surrounding the core such that the coated confectionery is in disc-like configuration with the core thereof being optically contrasted with the coating.

2. A confectionery as in claim 1, wherein the core is 25 to 75% by weight of the coating and is also 75 to 25% by weight of the confectionery.

3. A confectionery as in claim 1, wherein the protein is enzymatic protein with a molecular weight of 1,500 to 10,000.

4. A confectionery according to claim 1 or 2 or 3, wherein the protein is present in both the core and the coating and the protein is in the form of hydrophobed protein particles.

5. A confectionery as claimed in claim 1, wherein the core has a fat content of 2 to 15% by weight.

6. In a coated confectionery having a core compound containing protein and a coating containing sugar and having a protein content of 10 to 50% by weight, the improvement wherein the confectionery is in the form of a partially coated, disk-like configuration cut product wherein the coating compound surrounds the core compound and is optically contrasted therewith, and wherein the protein components are in the form of hydrophobed protein particles, said confectionery being obtainable by coating a paste-like, high protein core compound with a fat containing pliable, soft caramel compound, forming a strand and subdividing or cutting the strand.

* * * * *